United States Patent [19]

Crook

[11] Patent Number: 4,680,515

[45] Date of Patent: Jul. 14, 1987

[54] DIGITAL SPEED CONTROL OF MOTORS

[76] Inventor: James C. Crook, 6212 M North Hills, Raleigh, N.C. 27609

[21] Appl. No.: 736,754

[22] Filed: May 21, 1985

[51] Int. Cl.⁴ .................................... H02P 6/02

[52] U.S. Cl. .................... 318/318; 318/138; 318/254; 318/439; 318/341; 318/327

[58] Field of Search ............. 318/138, 326, 327, 329, 318/333, 341, 439, 254, 311-319, 599, 600-608

[56] References Cited

U.S. PATENT DOCUMENTS

| | | | |
|---|---|---|---|
| 3,835,360 | 9/1974 | Kiwiet | 318/561 |
| 3,906,319 | 9/1975 | Milligan | 318/341 X |
| 3,924,721 | 12/1975 | Reynolds | 318/685 X |
| 3,936,710 | 2/1976 | Tanikoshi | 318/318 |
| 4,009,427 | 2/1977 | Takahashi | 318/227 |
| 4,047,083 | 9/1977 | Plunkett | 318/231 |
| 4,054,820 | 10/1977 | Foster | 318/341 |
| 4,066,941 | 1/1978 | Foster | 318/341 |
| 4,072,884 | 2/1978 | Treadwell | 318/314 |
| 4,078,192 | 3/1978 | Fultz | 318/227 |
| 4,104,570 | 8/1978 | Hamby et al. | 318/314 X |
| 4,135,120 | 1/1979 | Hoshimi et al. | 318/138 |
| 4,153,863 | 5/1979 | Schachte et al. | 318/341 |
| 4,174,484 | 11/1979 | Schmider | 310/68 R |
| 4,197,489 | 4/1980 | Dunn et al. | 318/138 |
| 4,199,800 | 4/1980 | Weit | 318/327 X |
| 4,203,061 | 5/1980 | Minakuchi | 318/314 X |
| 4,208,621 | 6/1980 | Hipkins et al. | 318/138 |
| 4,242,618 | 12/1980 | Minakuchi | 318/341 X |
| 4,250,544 | 2/1981 | Alley | 318/254 X |
| 4,258,300 | 3/1981 | Fromont | 318/318 |
| 4,259,628 | 3/1981 | Iwakane et al. | 318/799 |
| 4,278,924 | 7/1981 | Mawatari et al. | 318/314 |
| 4,280,082 | 7/1981 | Acharya et al. | 318/341 |
| 4,298,832 | 11/1981 | Acker et al. | 318/341 X |
| 4,310,878 | 1/1982 | Hyatt | 364/183 |
| 4,314,188 | 2/1982 | Voigt | 318/314 X |
| 4,350,940 | 9/1982 | Dupont | 318/615 X |
| 4,357,567 | 11/1982 | Rock | 318/687 |
| 4,371,819 | 2/1983 | Kaufmann | 318/341 |
| 4,383,208 | 5/1983 | Nielson | 318/618 |
| 4,386,300 | 5/1983 | Ogawa | 318/314 |
| 4,394,594 | 7/1983 | Schmider et al. | 310/68 R |
| 4,400,654 | 8/1983 | Elliott | 318/312 |
| 4,413,212 | 11/1983 | Okamoto et al. | 318/317 |
| 4,443,747 | 4/1984 | Chausse et al. | 318/723 |
| 4,444,771 | 5/1984 | Whited | 318/254 X |
| 4,445,076 | 4/1984 | Kobari | 318/690 |
| 4,460,856 | 7/1984 | Mimumoto | 318/254 |
| 4,479,078 | 10/1984 | Kidd et al. | 318/254 |
| 4,484,128 | 11/1984 | Jötten et al. | 318/805 |
| 4,491,776 | 1/1985 | Veale | 318/618 X |
| 4,498,034 | 2/1985 | Shirakawa | 318/314 |
| 4,532,461 | 7/1985 | Crook | 318/254 |
| 4,543,516 | 9/1985 | Kobori et al. | 318/318 |
| 4,544,868 | 10/1985 | Murty | 318/138 X |
| 4,583,028 | 4/1986 | Angersbach et al. | 318/254 |

OTHER PUBLICATIONS

Microprocessor Control of Spindle Speed for Winchester Disk Drives, by Jacob Tal, Consultant, Mountain View, CA.

Motion Control Stability Compensation by Microprocessors, by Tacob Tal-Hewlett Packard, Palo Alto, CA.

Two-Chip Speed Control for Brushless DC Motors, by J. Tal, Consultant, Mountain View, CA.

*Primary Examiner*—William M. Shoop, Jr.
*Assistant Examiner*—Shik Luen Paul Ip
*Attorney, Agent, or Firm*—Mason, Fenwick & Lawrence

[57] ABSTRACT

A motor control apparatus is disclosed for controlling the rotational velocity of a drive shaft of an electric motor in accordance with a reference time period indicative of the desired rotational speed of the drive shaft. A sensor in the form of a tachometer provides a train of pulses. The period between tachometer pulses is measured and the difference between the reference and measured time periods is obtained. This difference is digitally processed by integrating, dividing and summing with a signal proportional to the difference to provide a motor command signal. The gains of the motor control apparatus are set to reduce phase delays and the deleterious effects thereof. Further, sensors in the form of Hall effect devices are disposed about the motor to each provide a train of timing signals. The timing signals are used to control the application of an energizing signal by corresponding switches to the motor coils; the level of the energization signal or current is set by the motor command signal. Further, the waveshapes of at least one Hall effect device output and the tachometer output are compared to identify a relationship occurring once in a rotor revolution, to generate a corresponding index or position pulse.

18 Claims, 10 Drawing Figures

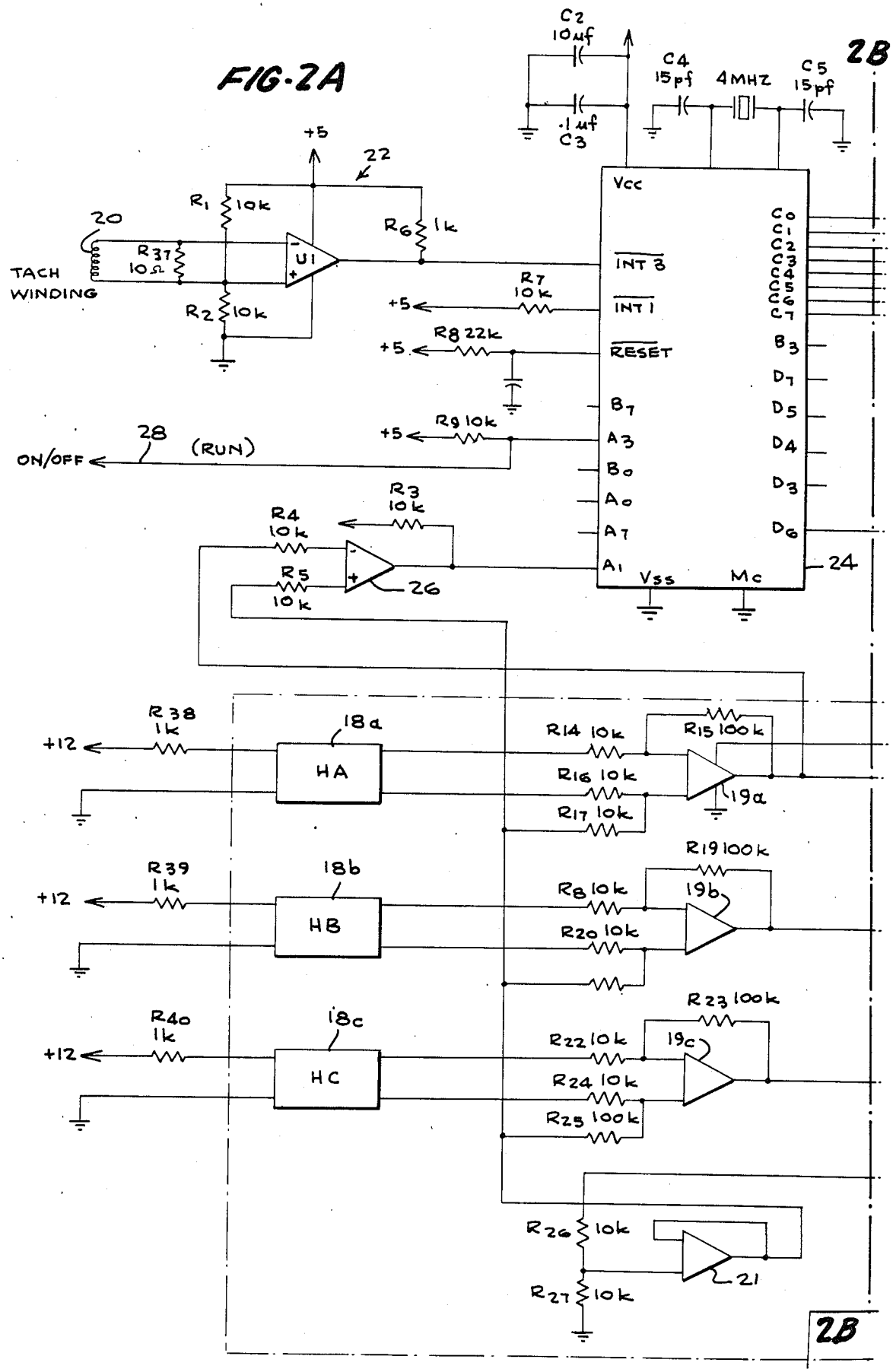

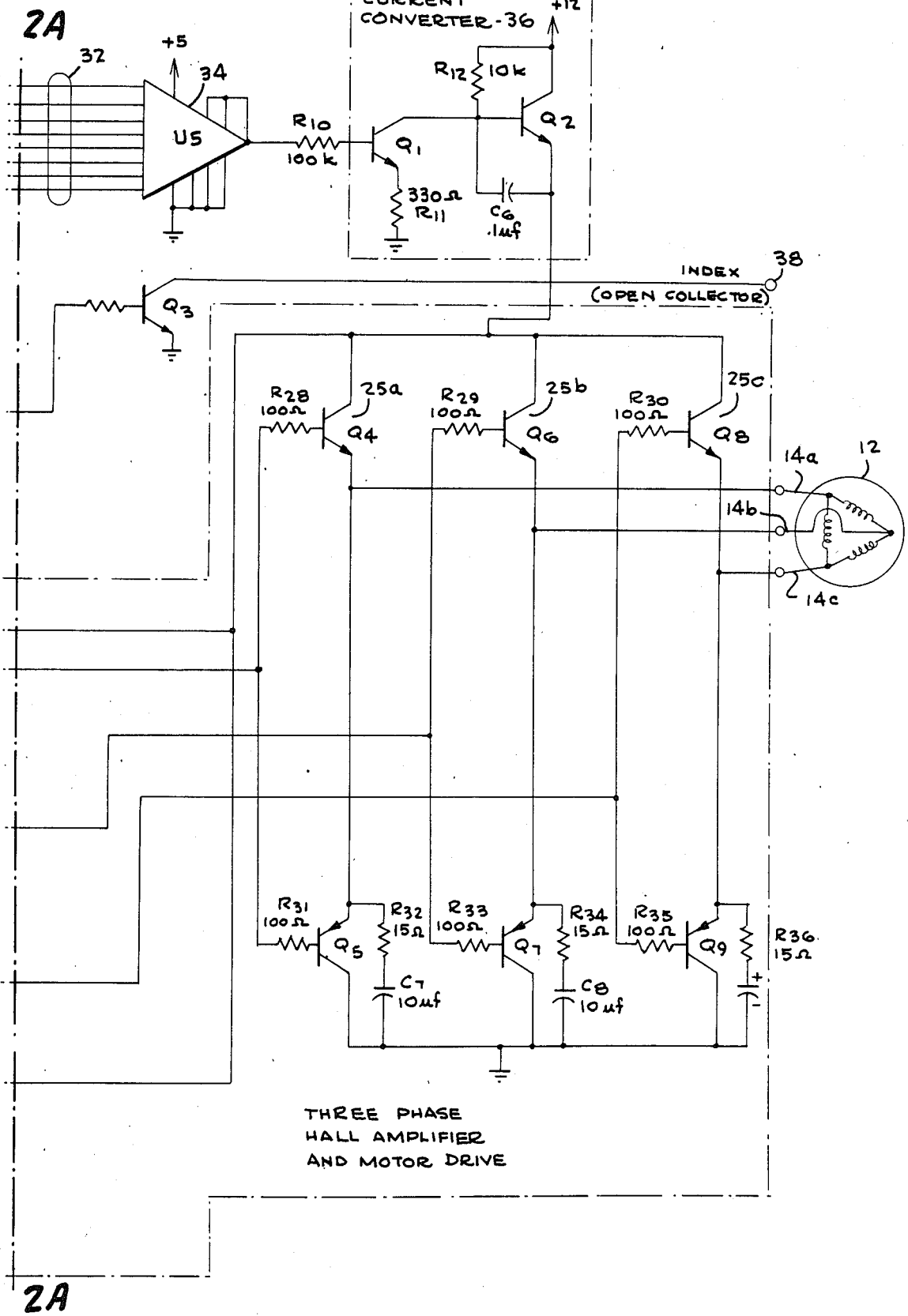

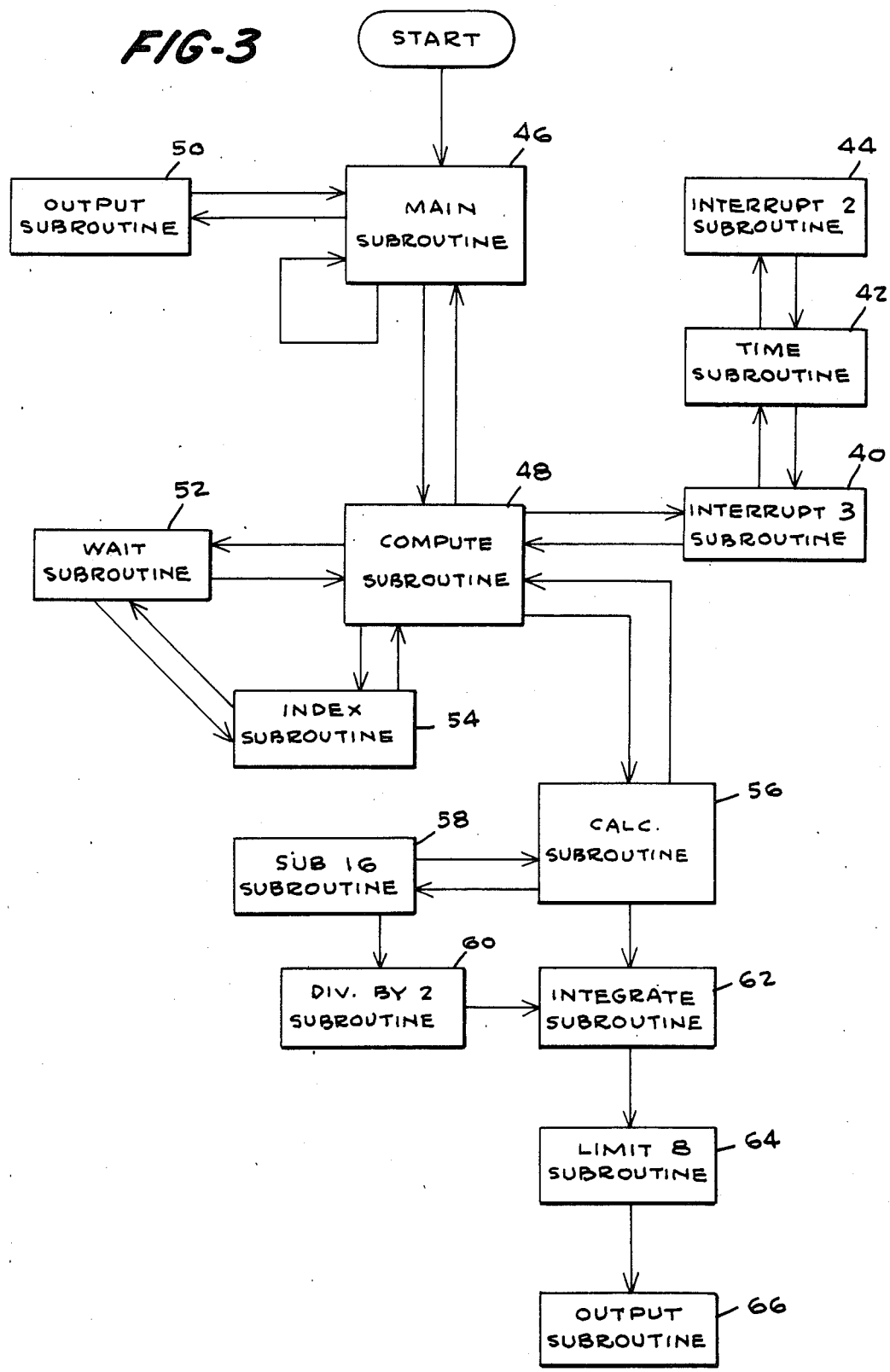

DIGITAL SPEED CONTROL OF MOTORS

BACKGROUND OF THE INVENTION

Field of the Invention

The present invention relates to speed controls for electric motors and, in particular, to such controls implemented digitally to improve the accuracy of the motor's speed, while employing less costly components.

CROSS REFERENCE TO RELATED APPLICATION

Cross reference is made to co-pending, commonly assigned U.S. patent application Ser. No. 681,271, filed Dec. 13, 1984 in the name of R. E. Welterlin and entitled "Brushless D.C. Motor and Tachometer Assembly."

DESCRIPTION OF THE PRIOR ART

This invention relates generally to direct drive brushless motors and, in particular, to digital motor controls for providing high accuracy speed control of such motors. Illustratively, such direct drive brushless motors may be used to drive floppy discs, where a high degree of rotational speed control is required. In general, brushless motors comprise a permanent field magnet secured to a rotor. The magnet is magnetized with regularly arranged magnetic poles of alternating polarity, and a stator having a plurality of driving coils disposed to cut the magnetic field of the magnet as the stator is rotated. A speed detecting coil is disposed in the field of the permanent magnet, whereby a voltage is induced therein by the field emanating from the magnetic poles.

In the prior art, a tachometer has typically been employed to provide a high frequency output signal proportional to the rotational velocity of the motor's rotor. The tachometer output is coupled to a frequency-to-voltage converter, whose output is a voltage signal of a level proportional to the rotational speed of the motor. In turn, the voltage signal is applied to an analog speed control circuit, which adjusts the input power applied to the motor to keep the speed constant within preset limits. In such an analog control, a tachometer capable of providing a high frequency output signal is desired in that such analog circuitry can only transform an average value of that frequency into a corresponding voltage signal. To provide such a high frequency output requires the addition of a magnet or magnets on the motor rotor, whereby the size and cost of the resulting motor is increased. Also the high frequency output of such tachometers provides an output with relatively high jitter, which must be averaged before it can be processed by the analog speed control circuitry. Further, the response time of such analog speed control circuitry is relatively slow.

In another approach, a relatively high frequency tachometer is coupled to the motor to generate a relatively high frequency signal. The tachometer output is applied in a feed-back loop and is compared with a referenced phase, whereby the motor speed may be adjusted as a function of the phase difference. Such phase-locked-loop techniques provide effective speed control over only narrow speed ranges and require a different technique of speed control during their start-up period.

Further, the prior art has measured the period between successive tachometer output pulses and used that period for controlling motor speed. A ramp-sample and hold circuit has been used to measure this time period. A voltage ramp generator is actuated upon the occurrence of a first tachometer pulse to generate a ramp output. Upon the occurrence of the next, successive tachometer output pulse, a sample and hold circuit captures the voltage level of the ramp generator as an indication of the time period. The accuracy of this approach is limited by the accuracy of the slope of the ramp output of the generator.

To overcome the inaccuracies of analog systems, U.S. Pat. No. 4,400,654 of Elliott discloses a digital speed control for a brushless motor employing at least one Hall effect sensor for providing a signal indicative of a rotor revolution. In turn, the sensor signal controls the application of a high frequency oscillator to a reference time counter. When the digital output of the reference time counter exceeds a reference value indicating that the motor's time period exceeds a reference time period, a second delta or difference counter is actuated to count a high frequency clock signal. The digital output of the difference counter indicating a difference between the desired and measured times of revolution, is used to control the energization of the motor.

U.S. Pat. No. 4,280,082 of Acahrya et al. also relates to a DC motor control employing the output of a tachometer to control the counting of an oscillator output upon a binary counter, recording that count occurring between two consecutive tachometer output pulses. This count is stored in a holding register and is used to control motor energization. U.S. Pat. No. 4,371,819 of Kaufmann employs a microprocessor to time the period between the output pulses of an encoder attached to a DC motor. The timer as implemented by the microcomputer compares the measured time period with a reference time period corresponding to the reference motor speed and provides a digital value indicative of the difference. This difference value is in turn used to control the energization of the DC motor. Kaufmann determines the length of three consecutive time periods, obtains an average of these time periods and provides a digital value indicative of the difference between the reference and sensed time periods.

Jacob Tal describes in his article "Microprocessor Control Of Spindle Speed For Winchester Disc Drives" appearing in the *Motor-Con April* 1983 *Proceedings*, a speed control for a Winchester disc drive employing a microprocessor. Winchester disc drive motors typically employ Hall sensors to provide periodic signals, whose period is measured to provide an indication of rotation period and an inverse indication of motor speed. The microprocessor is programmed to measure the period between the output pulses of the Hall sensors and to compare that period with a reference period. The reference period is multiplied by a gain factor to provide a motor command, which is sampled and held between command updates. Tal suggests broadly that it is necessary to compensate for the delay due to the periodic sampling by the use of digital compensation and, in particular, digital filters that effect lead compensation and, further, the use of an integrator to eliminate velocity variations. This article of Tal fails to provide the specifics of the generally described microprocessor system.

The Schachte et al. U.S. Pat. No. 4,153,863 describes a motor control system similar to that of Kaufmann, as described above. Schachte et al. employ an encoder coupled to the DC motor, to apply pulses to a bi-directional counter, whose count is periodically sampled to provide velocity position information. The sampled count is digitally processed in a microprocessor to provide a number indicative of velocity error, which is intergrated and is multiplied by a scaler to provide a product summed with the output of an integrator, thus effecting a proportional plus integral control of a velocity loop. The sum of the scaler and the integrator is applied to control the operation of the motor.

BRIEF SUMMARY OF THE INVENTION

It is an object of this invention to provide a new and improved motor speed control apparatus employing a generator coupled to the controlled motor for producing output signals of a frequency relatively low compared to the rotational velocity of the motor;

It is a further object of this invention to provide a new and improved control apparatus for a brushless DC motor responsive to the rotation of the rotor to cyclically apply a current source to the motor windings.

It is a still further object of this invention to provide a new and improved motor control apparatus for providing an index pulse upon the rotation of the motor rotor past a fixed point.

It is a still further object of this invention to provide a new and improved motor speed control apparatus employing digital components for digitally processing speed data to in turn energize the motor to run at a predetermined speed.

SUMMARY OF THE INVENTION

In accordance with these and other objects of this invention, there is disclosed a motor control apparatus for controlling the rotational velocity of a drive shaft of an electric motor in accordance with a reference time period indicative of the desired rotational velocity of the drive shaft. The motor control apparatus includes a mechanism illustratively in the form of an encoder or tachometer coupled to the drive shaft for providing a first train of pulses, each pulse corresponding to a given angle of drive shaft rotation. The period between pulses of the first train is measured to provide a difference signal between the referenced time period and the measured time period. Speed control as may be illustratively implemented in a programmed microcomputer integrates the difference signal, divides the integration output by factor N and sums the divided signal with a signal proportional to the difference signal to provide a motor speed control signal. In one aspect of this invention, the factor N is selected to desirably control the gain of the motor control apparatus.

In a further aspect of this invention, the inter-pulse measuring is carried out by a counter that counts clock signals of a given frequency as occur between selected, e.g. consecutive, pulses of the first train. A Bode plot of the composite motor response includes an integral curve portion and a proportional curve portion. The dividing factor N and the frequency of the clock signal is selected such that the gains of the integral curve portion and of the composite response are respectively set such that the crossover frequency is set to reduce the deleterious effects of phase delays.

In a further aspect of this invention, the integration, dividing and taking a difference functions are effected by a microcomputer executing a program. The integration and dividing steps are performed quickly and no multiplication is carried out by the program as has been effected by the prior art scalers, whereby the time of processing or program execution is reduced, i.e., no additional time or phase delays are incurred.

In a still further aspect of this invention, a plurality of sensors, illustratively in the form of Hall effect devices, is disposed about the motor for each generating a train of timing signals as the drive shaft rotates past its corresponding position. A source of energization, illustratively a current generator, is responsive to the level of the command signal for supplying an energizing signal of a corresponding level. A plurality of switches is responsive to the trains of timing signals for sequentially supplying the energizing signals to the coils of the electric motor.

In a further aspect of this invention, the Hall effect devices are continuously controllable devices in the sense that their output does not abruptly change from one state to the other, whereby gradual current changes are applied by the switches to energize the motor coils.

In a still further feature of this invention, a position or index pulse is generated for each rotor revolution. In particular, X pulses are generated by the tachometer for each rotor revolution, where X is a whole number. The output of the Hall effect devices is set to generate Y timing signals for each rotor revolution, where Y is a whole number and X equals (WY±1) and W is any whole number. Further, a comparing process as illustratively implemented by an executed program compares the waveshapes of the outputs of the tachometer and the Hall effect device to identify a given relationship therebetween occurring once per revolution to generate the position pulse. In an illustrative embodiment, the unique relationship occurs upon the first occurring transition of the Hall effect device from its high to low state, when the output of the tachometer is high. In the program, a FLAG is set upon the first occurrence of the low to high transition of the Hall effect device, the FLAG being erased upon the subsequent occurrence of a high to low transition of the Hall effect device, when the tachometer output is low.

BRIEF DESCRIPTION OF THE DRAWINGS

A detailed description of the preferred embodiment of this invention is made in conjunction with the following drawings in which like reference numerals are used in the different figures for illustrating the same elements:

FIG. 2 is a detailed, schematic diagram of the functional block diagram of FIG. 1 illustrating the particular circuit elements, an illustrative microcomputer and their manner of connection to the motor to be controlled;

FIG. 3 is a hierarchy chart of the program executed by the microcomputer shown in FIGS. 1 and 2 illustrating generally the sequence of the execution of its various subroutines;

DETAILED DESCRIPTION OF THE INVENTION

Figure 1:
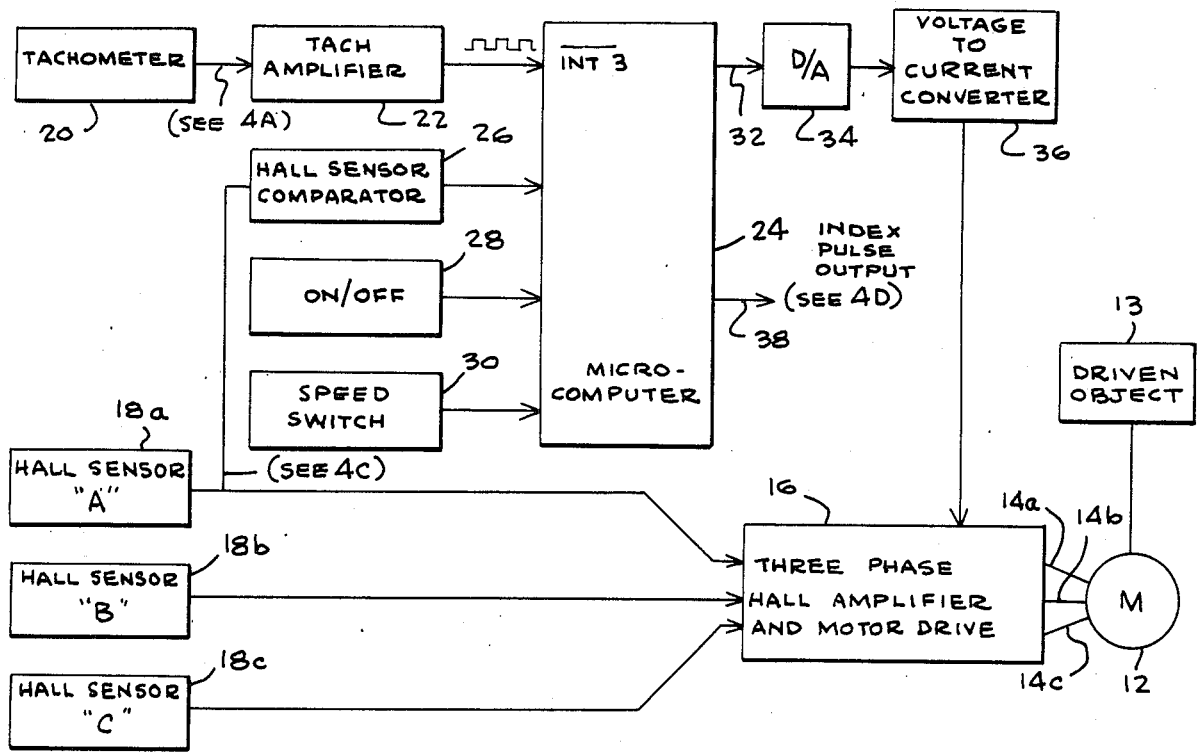
FIG. 1 is a functional block diagram of the motor control in accordance with the teachings of this invention.

Referring now to the drawings and, in particular, to FIG. 1, there is shown digitally implemented motor speed control apparatus 10 in accordance with the teachings of this invention. The disadvantages and, in particular, the limited accuracy of the prior art, analog approaches are overcome by the use of digital components and, in particular, a microcomputer 24, which permits a low cost implementation of the motor speed control apparatus 10 of this invention. As will be explained, the microcomputer 24 executes a program to generate an eight bit command signal upon its output bus 32. The magnitude of the command signal is indicative of the desired torque and, therefore, the speed at which the motor 12 is to be driven, assuming that a relatively stable load is imposed on the motor 12. In an illustrative embodiment of this invention, the motor 12 may take the form of that three phase brushless motor as described in the above identified application. A tachometer 20, also as described in the above identified application, is coupled to the motor 12 to produce a train of output signals or pulses, whose frequency corresponds to the rotational velocity of the rotor of the motor 12. The frequency of the output pulses from the tachometer 20 is relatively low and the output pulses have a relatively low jitter content, whereby a relatively high degree of speed control may be obtained.

The train of output pulses from the tachometer 20 is amplified and shaped by a tach amplifier 22, to provide square waveshaped pulses to an interrupt $\overline{INT\ 3}$ of the microcomputer 24. As will be explained in greater detail with respect to the program of FIG. 3, the application of the shaped tachometer pulses initiates a measurement of the time period between successive pulses, which period is inversely proportional to the motor speed. In turn, a digital indication of the inter-pulse period is digitally processed by comparison to a reference count indicative of the desired motor speed, to provide the eight bit command signal as appearing on the bus 32, as mentioned above. In turn, the eight bit command signal is converted by a converter 34 to an analog value to provide a control signal to a voltage to current converter 36. The converter 36 applies a current of an amplitude corresponding to its analog input and therefore the eight bit command signal of the microcomputer 24. The variable current is applied to a three phase Hall amplifier and motor driver 16, whereby a controlled level of current is sequentially applied via the lines 14a, 14b and 14c to the delta-connected coils of the three phase brushless motor 12. Alternatively, the motor 12 may have Wye connected coils and the position sensors would in such an embodiment be repositioned to match the phasing required by the Wye connection. Three sensors and, in particular, three Hall effect sensors 18a, 18b and 18c are disposed at equal angles about the motor 12 to generate a train of signals in response to the rotation of its rotor, these signals are applied to the three phase Hall amplifier and motor driver 16 to switch in sequence the regulated current via of the corresponding lines 14a, 14b and 14c to the coils of the three phase brushless motor 12.

In a further aspect of this invention, the output of the tachometer 20 and the output of one of the Hall effect sensors 18 as amplified by a Hall sensor comparator 26 are applied to the microcomputer 24, whereby index pulses are developed at an output 38 indicative of the rotation of the motor's rotor past a fixed point. Such index pulses may be used to provide rotor position sensing. Further as shown in FIG. 1, an input as may be derived from an on/off switch or some associated controlling apparatus, controls the turning on and off of the motor 12. For example, where the three phase brushless motor 12 is used to drive those memories known as floppy discs, the on/off control 28 may be derived from of a computer that provides a signal actuating the motor 12 for that time required to read-out or write a given quantity of data. In such an application, the index pulse appearing at the output of 38 may be used to determine the sector of the floppy disc from which data is to be derived, and to control the position of the motor's rotor and, therefore, the floppy disc with respect to the read/write heads. Further, a speed switch 30 permits an operator to enter various parameters into the microcomputer 24 to adjust the digital processing of the tachometer output. For example, a different reference count indicative of a new desired speed may be programmed. Other, processing variables may be programmed as will be elaborated below.

Referring now to FIG. 2, there is shown a detailed circuit diagram of the motor speed control 10 as generally shown by the functional block diagram of FIG. 1. Briefly, the winding of the tachometer 20 is coupled to the tach amplifier 22 as comprised of the operational amplifier U1, whose output is connected to the interrupt $\overline{INT\ 3}$ of the microcomputer 24; the microcomputer illustratively takes the form of that processor identified by the model number TMS7020. The on/off signal as input via terminal 28 is applied to the A3 terminal of the microcomputer 24. A 4 MHz signal of substantially constant frequency is developed by a crystal XTAL and applied to terminals 11 and 12 of the microcomputer 24. The eight bit command signal is derived from the C0 to C7 outputs of the microcomputer 24 and is applied via the digital-to-analog converter 34 to the converter 36 as comprised essentially of the transistors Q1 and Q2.

The controlled current derived from the converter 36 is applied to the three phase Hall amplifier and motor drive 16, which as shown in detail in FIG. 2 comprises a first or preamplifier section and a second or power amplifier section. In the power amplifier section, each output conductor 14a, 14b and 14c is coupled to one terminal of the delta connected coils of the three phase brushless motor 12, and is driven by a pair of transistors connected in push/pull arrangement. For example, input 14a is connected to the emitters of transistors Q4 and Q5 and upon an occurrence of the output from the Hall effect sensor 18a, are turned on to apply the regulated current via the conductor 14a to the coils of the motor 12. Each of the Hall effect sensors 18a, 18b and 18c is connected to a corresponding preamplifier 19. The controlled current derived from the converter 36 is applied to a resistive bridge comprised of resistors R26 and R27; the midpoint thereof is connected to an operational amplifier 21 to provide a reference voltage equal to half that voltage appearing across both of the resistors R26 and R27 to ground. The variable reference voltage is applied to one terminal of the preamplifiers 19a and 19b and 19c, whereby their differential output is biased by the reference voltage. In turn, the preamplifiers 19 provide such a biased voltage to a corresponding pair of push/pull coupled transistors 25. For example, the amplifier 19a associated with the Hall effect sensor 18a is coupled to the base of transistors Q4 and Q5; the amplifier 19b associated with Hall effect sensor 18b is coupled to the base of transistors Q6 and Q7; and the amplifier 19c associated with Hall effect sensor 18c is coupled to the base of transistors Q8 and Q9.

In addition, the reference voltage developed at the point of interconnection of resistors R26 and R27 is also applied to one input of that operational amplifier forming the Hall sensor comparator 26, the other input being derived from the output of the preamplifier 19a, whereby when the output of the operational amplifier 19a goes high, the output of the comparator 26 as coupled to the microcomputer 24, goes low. It is appreciated that the outputs of the Hall effect sensors 18 will vary as a function of the rotor position with respect to the delta coupled coils of the motor 12. Thus, the operational amplifier 21 outputs a variable reference voltage corresponding to the amplitude of the driving current. Thus as the output of the Hall effect sensor 18a varies, the reference voltage supplied to the comparator 26 will also vary so that the output of amplifier 26 will occur at the same relative time regardless of the driving current provided by converter 26.

The program executed by the microcomputer 24 is illustrated in FIG. 3; in particular, the hierarchy of the various subroutines is shown. At the beginning of operation, the program is in its MAIN subroutine 46. If the on/off or run signal to the A3 input of the microcomputer 24 is low, a first loop cycles, whereby the various interrupts including $\overline{INT\ 3}$ are disabled and the outputs including C0 to C7 and D6 are set to zero. When the run signal goes high, the first loop ends and a second startup sequence begins setting the outputs C0 to C7 fully on, calls an OUTPUT subroutine 50 to be explained below, starts applying the crystal oscillator output to an internal register of the microcomputer 24 acting as a timer and enables the interrupts including $\overline{INT\ 3}$ and $\overline{INT\ 2}$. After enabling the interrupts, the MAIN subroutine 46 will commence a second loop, which cyclically looks at the A1 port to determine whether the run signal has gone low and, if not, calls the COMMUTATE subroutine 48. If the run signal goes low, the MAIN subroutine 46 will return to it initial step completing the outer loop. The MAIN subroutine 46 will continue to loop as described above, while placing periodic calls to the COMMUTATE subroutine 48.

Initially, the COMMUTATE subroutine 48 looks at the $\overline{INT\ 3}$ interrupt of the microcomputer 24. When the $\overline{INT\ 3}$ interrupt goes high, the COMMUTATE subroutine 48 calls a WAIT subroutine 52 to permit the inputs to settle, enables the $\overline{INT\ 3}$ interrupt and sets a flag that at a later point will permit the INTERRUPT 3 subroutine 40 to interrupt the program. The WAIT subroutine 52 effects the delay in the program by cyclically adding a count to a counter until that count equals the desired time, e.g. 50 microseconds. When the desired count is reached, the WAIT subroutine 52 returns to that subroutine from which it exited. The program is designed to permit the tachometer output to interrupt the program and to branch to the INTERRUPT 3 subroutine 40 only at selected times in the program and, thereby, to prevent spurious signals form otherwise interrupting the program. These aforementioned steps will repeat until the signal as derived from the tachometer 20 and appearing at the interrupt $\overline{INT\ 3}$ goes low; then, the signal as derived from the Hall sensor comparator 26 and appearing at the A1 input of the microcomputer 24 is examined and its value placed in a PRESENT-INDEX register indicative of the presence or absence (1 or 0) of the Hall's sensor comparator output. The previous value, i.e., whether 1 or 0, is placed in a PREVIOUS-INDEX register. Then the COMMUTATE subroutine 48 examines the PRESENT and PREVIOUS INDEX registers and, if the PRESENT INDEX REGISTER is 1 or high and the PREVIOUS INDEX REGISTER is 0 or low, the COMMUTATE subroutine 48 calls an INDEX subroutine 54. The INDEX subroutine 54 and the COMMUTATE subroutine 48 are executed to sense the outputs of the tachometer 20 and the Hall effect sensor 18a, as respectively shown in FIGS. 4A and 4B, to generate on the output 38 an index pulse, as shown in FIG. 4D. The setting of the HALF flag high and low is shown in FIG. 4C.

Considering now the INDEX subroutine 54, the HALF flag must be set low, before entry is made into the INDEX subroutine 54. If the HALF flag is set high, a return will be made to the COMMUTATE subroutine 48. If the HALF flag is low, the INDEX subroutine 54 causes the output 38 to go low and calls the WAIT subroutine 52 to set a predetermined delay before the index pulse goes low to form the index pulse as shown in FIG. 4D. The COMMUTATE subroutine 48 only sets the HALF flag high after an index pulse has been generated and, as will be explained, sets the HALF flag low when the HALL effect sensor output to the port A1 of the microcomputer 24 transitions from low to high and the output of the tachometer 20 is low. Thereafter, the INDEX subroutine 54 returns to the COMMUTATE subroutine 48, the HALF flag is set high indicating that an index pulse has just been generated. Next, the run input appearing at the A3 port of the microcomputer 24 is examined and, if low, an exit is made from the COMMUTATE subroutine 48. After the A3 port is examined, the CALC subroutine 56, as discussed below, is called.

Still considering the COMMUTATE subroutine 48, the amplified tachometer output at the A1 port is examined again and, if low, the input at the A1 port of the microcomputer 24 is read and the low or high value indicative of the absence or presence of the output of the Hall sensor comparator 26 is noted and stored in the PRESENT-INDEX register. If the PRESENT-INDEX register is high and the PREVIOUS-INDEX register is low, then the HALF flag is set low as shown in FIG. 4C, preparing the program to generate the next index pulse. Thereafter, the value of the PRESENT-INDEX register is transferred to the PREVIOUS-INDEX register. Then the COMMUTATE subroutine 48 determines whether the run input at the A3 terminal is low and, if so, the subroutine exits. When the tachometer output again goes high, a return is made from the COMMUTATE subroutine 48 to the MAIN subroutine 46.

Figure 4A:
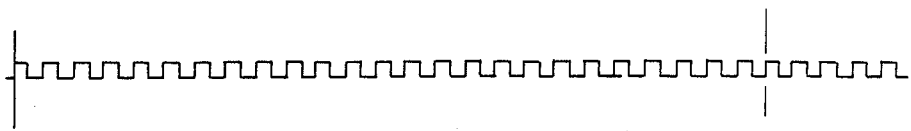
FIGS. 4A, B, C and D illustrate the signals as variously derived from a tachometer and a Hall sensor associated with the motor to be controlled, to generate an index pulse indicative of the rotation of the motor rotor past a fixed point.
Figure 4B:
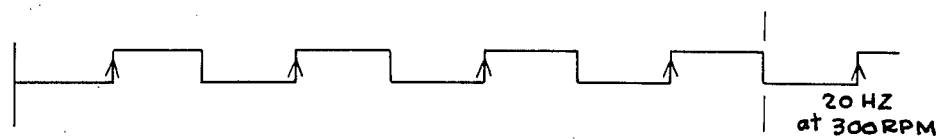
Figure 4C:
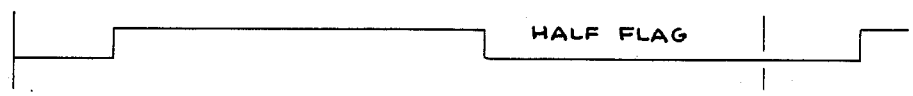
Figure 4D:
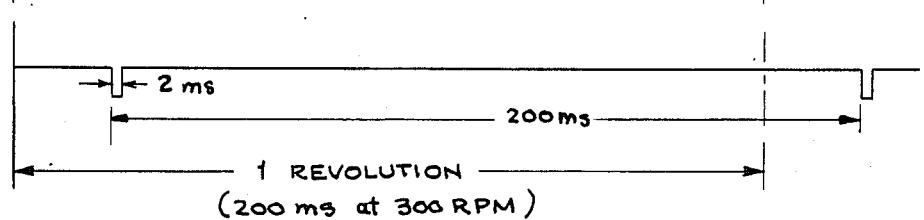

The generation of the index pulse by the INDEX subroutine 54 and the COMMUTATE subroutine 48 occurs, as shown in FIGS. 4A, B, C and D, once per revolution of the motor rotor. The index pulse occurs upon the occurrence of the rotation of the rotor past a fixed point. Such an index pulse is typically used by associated apparatus such as a floppy disc drive control, to provide an indication of instantaneous position. The floppy disc drive controls of the prior art have typically used an additional sensor to generate such an index pulse; for example, an optical sensor has been used to sense the passage of an opening within the floppy disc to generate such an index pulse. In accordance with this invention, the outputs of the tachometer 20 and one of the Hall effect sensors, as are used to effect motor speed control, are also used to generate such an index pulse, without employing additional hardware. This is accomplished by setting the proper number of tachometer output pulses per revolution of the motor's rotor, in comparison with the number of pulses generated by the Hall effect sensor 18a. The Hall effect sensors 18a generate four pulses as shown in FIG. 4B corresponding to a like number of pair poles within the structure of the magnet of the motor 12, as more fully explained in the above referenced patent application. The required relationship between the number of tachometer pulses per revolution and the number of pair poles or Hall effect pulses is expressed as follows:

$$X = YW + 1$$

or $$YW - 1,$$

Where X is that whole number of tachometer output pulses per revolution of the motor's rotor, Y is the whole number of pole pairs of the magnetic structure of the rotor (or output pulses of the associated Hall effect sensor 18a) and W is any whole number between 0 and infinity. Referring now to FIGS. 4A, B, C and D, it is seen that the number of tachometer pulses X is 25 and there are four pair poles providing four output pulses from the Hall effect sensor 18a. For such a configuration, W would be equal to 6, thus satisfying the above equation. By satisfying these conditions, it can be seen that the waveshapes of the tachometer output and the Hall effect sensor match up only once per revolution of the motor's rotor and that the COMMUTATE subroutine and the INDEX subroutine 54 detect such a coincidence. In particular, an index pulse is generated when the tachometer output is high and there is a transition of the Hall effect sensor output from low to high, such wave shape conditions occurring twice sequentially per revolution of the motor's rotor due to the satisfying of the stated conditions; the second occurrence of such waveshape condition is defeated from generating an index pulse by setting the HALF flag as shown in FIG. 4C.

The INTERRUPT 3 subroutine 40 only interrupts the program after its interrupt flag has been set and the INT 3 interrupt has been enabled by the COMMUTATE subroutine 48, as explained above. Thereafter upon the occurrence of the next tachometer output, the program is interrupted and the INTERRUPT 3 subroutine is called to in turn call the TIME subroutine 42. The TIME subroutine 42 stops the counter and transfers the count stored therein to a known location in the microcomputer 24 for further use. Thereafter, the timer is restarted to time the next inter-pulse period. If the inter-pulse period exceeds the capacity of the timer, a signal is generated to branch to the INTERRUPT 2 subroutine 44, which handles the overflow of the primary counter into a second most significant eight bit register, permitting the microcomputer to handle 16 bits of data. In particular, the next count over the capacity of the primary counter is added to the second counter. After a return is made to the TIME subroutine 42, and the count is read-out, it is the bits as stored in both the primary and secondary counters that are read-out. After the TIME subroutine 42 is finished, the program returns to the INTERRUPT 3 subroutine 40, which in turn returns to that program that was interrupted upon the occurrence of the tachometer output pulse. At this point in the program, the present inter-pulse period has been measured and is available to be digitally processed by the CALC subroutine 56.

As indicated above, a call is placed in the COMMUTATE subroutine 48 for the CALC subroutine 56 which calculates the period of time between successive tachometer outputs, which period is the inverse of the rotational velocity of the motor 12. Further, the CALC subroutine 56 digitally processes that digital value indicative of the inter-pulse period in a manner to improve motor control at a substantially constant rotational velocity and to accommodate low data sampling rates as provided by the output of the tachometer 20. The tachometer output is 125 Hz or 25 pulses per revolution of the motor 12, noting that the motor 12 rotates five times per second when the selected speed is 300 RPM. As will be explained, the TIME subroutine 42 determines the inter-pulse period between the outputs of the tachometer 20 and stores that period in a memory of the microcomputer 24.

Figure 6A:
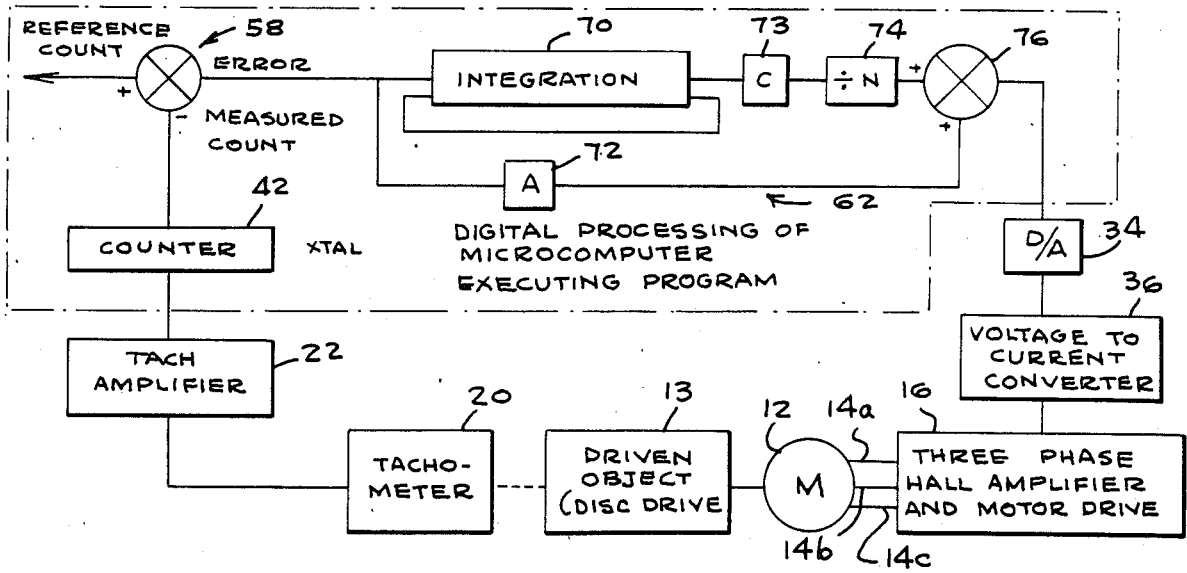
FIGS. 6A and B are respectively a functional block diagram of the motor control of this invention particularly illustrating the digital processing of the tachometer output to control motor speed and a Bode plot illustrating the proportional plus integral control effected by motor control apparatus of this invention.

To assist in understanding the CALC subroutine 56, FIG. 6A illustrates at a high level the digital processing of the amplified output of the tachometer 20, to provide the eight bit command signal to the digital to analog converter 34. In brief summary of the previous description of FIGS. 1 and 2, the output of the converter 34 controls the current level supplied to the three phase Hall amplifier and motor drive 16, which cyclically applies current to energize the three phase coils of the motor 12. As suggested in FIG. 6A, the motor 12 drives a disc drive 13. The tachometer 20 is coupled with the disc drive 13 and the motor 12 to provide output pulses at a frequency dependent upon the rotational velocity of the motor 12.

The CALC subroutine 56 digitally processes that inter-pulse period by first calling the SUB 16 subroutine 58, which determines the error or difference between the measured inter-pulse period and a referenced value or period as entered into the memory of the microcomputer 24; the reference period sets the desired rotational velocity of the motor 12. A DIVIDE-BY-TWO flag is set true, when it is desired to reduce the gain of/or the amount of correction imparted by the motor control apparatus. When the flag is set, the DIVBY2 subroutine 60 is called; if not, the CALC subroutine 56 skips the DIVBY2 subroutine 60 and calls the INTEGRATE subroutine 62 to effect the desired additional processing of the error signal. Thereafter, the LIMIT 8 subroutine 64 is called to limit the number of bits of the command signal to eight. The limiting of the bits in the command signals permits use of an eight bit digital-to-analog converter 34, which is less expensive than a 16 bit converter. Thus, this system is limited to handling only signals of an amplitude up to 256. Next after the command signal has been limited, an OUTPUT subroutine 66 is called to provide a gradual change in the output to avoid the imposition of rapidly changing currents to the coils of the motor 12. Thereafter the CALC subroutine 56 returns to the MAIN SUBROUTINE 46.

As illustrated in FIG. 6A, the output of the crystal XTAL is counted by the TIME subroutine 42 between occurrences of the tachometer output pulses. Then, the SUB 16 subroutine 58 obtains that count indicative of the reference period, and subtracts therefrom that count indicative of the measured inter-pulse period to obtain a difference or error signal appearing as a 16 bit byte of data, before returning to the CALC subroutine 56. If the DIVIDE-BY-TWO flag is set true, the DIVBY2 subroutine 60 performs a division of the 16 bit error signal by two, thereby decreasing the gain or degree of compensation effected by this program.

Thereafter, the INTEGRATE subroutines 62 takes the error between the reference count and the measured count as obtained by the SUB 16 subroutine 58 and integrates that error or difference signal by adding the value of error to the previous sum or intergration value to provide the present value of integration as illustrated by the integration block 70 of FIG. 6A. In order to prevent the gain of the system from being set too high, the output of the integration block 70 is divided by N in block 74. As reflected by block 72, a proportional error is taken and summed in adder 76 with the integration error divided by N to provide the digital command signal to control the degree of current excitation as applied to the motor 12.

As explained above, the eight bit command signal output by the summer 76 controls the current supplied to the coils of the motor 12. In turn, the energizing current determines the rotational torque applied to the driven object 13, e.g. a disc drive for a floppy disc. If the load remains constant and the exciting current increases to the motor 12, its rotational velocity will increase. As the rotational velocity of the driven object 13 changes, the frequency of the output of the tachometer 20 will also vary accordingly, whereby that measured count as accumulated in the counter effected by the TIME subroutine 42, between the occurrences of the output pulses of the tachometer 20 will likewise vary.

Figure 6B:
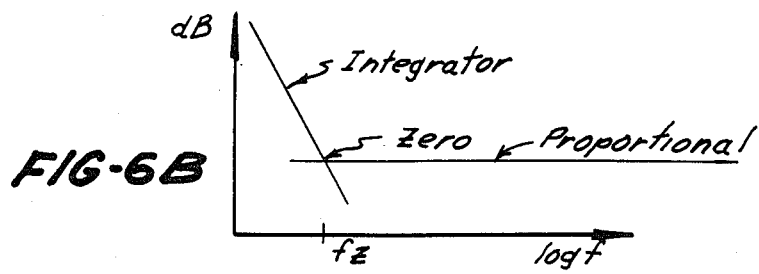

The proportional/integral processing effected on the error or difference signal by the INTEGRATE subroutine 62 is illustrated in the Bode plot diagram of FIG. 6B. As is well known in the art, a Bode plot represents the ratio of the output of a given system to an input disturbance signal, as a function of frequency, the curves being plotted in logarithmic fashion. The frequency of the Zero, i.e., the intersecting point of the proportional curve and the integrator ramp or curve as seen in FIG. 6B, depends on the ratio of the gains of the integrator and the proportional terms and occurs when the value of proportional error, i.e., output of block 72, is larger than the integrator error output of the divide by N block 74.

Figure 5:
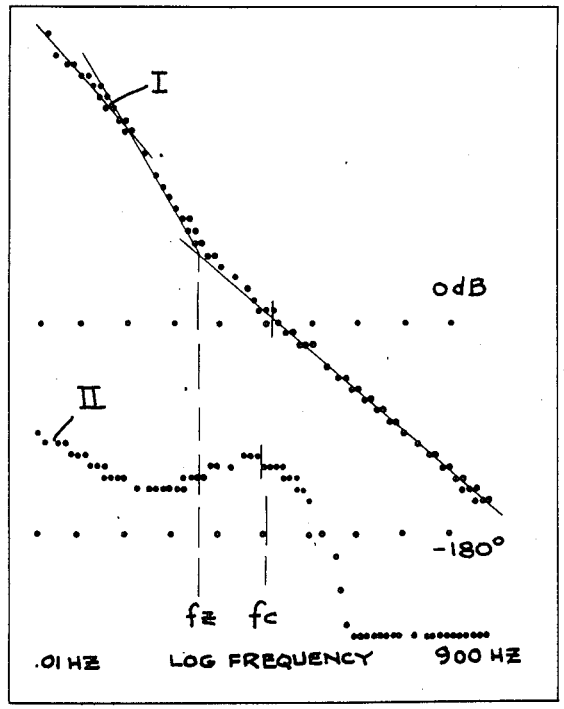
FIG. 5 is Bode plot as a function of frequency of a motor controlled in accordance with the teachings of this invention.

The composite curve derived from inserting the integration curve on the proportional curve as shown in FIG. 6B is shown by the gain or amplitude curve I of FIG. 5. Curve II shows the frequency characteristics of a system as a function of increasing frequency. It is recognized in the art the desire to operate a motor control system in the vicinity of its crossover frequency, i.e, the gain should not be such as to make the system unresponsive, whereas too much gain will lead to oscillating performance. One of the problems with which this invention deals is that caused by selecting the frequency of the tachometer output to be relatively low, e.g. 125 Hz. The selection of such a frequency introduces a relatively high phase delay in the feedback loop of the motor control system, with a possible result that this system approaches oscillation. This invention deals with the effects of such phase delay and, also, the problem caused by the greater time required to effect digital calculations by a microcomputer, as compared to the time required by hardwired digital components.

First, this invention recognizes that the system gain may be decreased by increasing the value of N by which the division in block 74 is carried out upon the integration output. As gain increases, the integrator curve as particularly shown is FIG. 6B is moved up along the db axis, thereby increasing the Zero frequency fz. Further, this invention recognizes that by changing the frequency of the crystal oscillator XTAL as applied to the counter shown in block 42, that the position on the horizontal scale of the composite curve I as shown in FIG. 5 may be moved up and down the horizontal axis. Increasing the frequency of the signal as applied to the counter 42 increases the gain, moves the composite curve I up and increases the crossover frequency fc. However, if the counter frequency is set too low, the system gain would be decreased and sluggish motor control performance would result, i.e., the motor would be slow to come to desired speed and/or to recover from a load change. The clock frequency and the factor N may be variably set by use of the speed switch 30.

Further, this invention uses calculations, as particularly shown in FIG. 6A, that are fast to avoid the imposition of any further delay as would adversely effect the phase curve II of FIG. 5. In particular, integration is performed in block 70 by summing the error count with the previous sum of errors, thereby integrating the period difference. This summation occurs once with each tachometer pulse. The division as performed in block 74 is carried out by standard bit shifting software procedures, which are known to be relatively fast. This invention in its preferred embodiment avoids multiplication by scaler factors as taught by the prior art, which multiplication is relatively time consuming and would impose detrimental phase delays. In FIG. 6A, it would not be unusual of the prior art to multiply the integration output by a scaler C as shown in block 73 or to multiply the proportional term by a scaler A as indicated in block 72. However, in a preferred embodiment of this invention, the scaling factors C and A are set equal to 1 to thereby avoid any multiplication operations within the digital processing performed by the microcomputer 24. The gain and the Zero frequency fz of the motor control system as functionally illustrated in FIG. 6A, are:

$$\text{GAIN} = \frac{A - AC + B}{1 - C}$$

$$fz = F\_Tach \frac{(1 + C + B/A)}{2} \text{ (Hz)},$$

where the gain is the GAIN of the entire motor control apparatus, F Tach is the frequency of a tachometer output, C is the multiplier of the integration term, A is the multiplier of the proportional term and B equals 1/N. If A and C are set equal to 1, then the following expressions results:

$$\text{GAIN} = F\_Tach*B$$

$$\text{ZERO} = \frac{F\_Tach \times B}{2A\pi} \text{ (Hz)}$$

The following represents the actual parameters that were used in an illustrative embodiment of the motor control system according to FIG. 6A including a 13 pole tachometer:

| INPUTS: | |
| --- | --- |
| COEFFICIENT A | 1 |
| COEFFICIENT B | 0.03125 |
| COEFFICIENT C | 1 |
| ROTOR DAMPING | 0.000016189 |
| ROTOR INERTIA | 0.000036 |
| CALCULATED RESULTS: | |
| uPROCESSOR GAIN | 2.03125 |
| uPROCESSOR ZERO | 0.323283478 |
| uPROCESSOR POLE | 0 |
| MOTOR POLE | 0.071571093 |
| SAMPLING DELAY | 0.015384615 |
| DELAY PHASE SHIFT | −24.9963491 |
| FEEDBACK GAIN | 9.861932938 |
| FREQUENCY IND. GAIN | 127.7781082 |
| UNITY GAIN FREQUENCY | 4.513229699 |
| PHASE MARGIN | 61.81506540 |
| COUNTER FREQUENCY | 41666.66666 |
| REFERENCE COUNT | 641.0256410 |

Following the INTEGRATE subroutine 62, the LIMIT 8 subroutine 64 inputs the 16 bit signal as derived from the INTEGRATE routine 62 and limits that signal to the least significant eight bits, i.e., providing an eight bit command signal having values between 0 and 255. In this fashion, an eight bit additional analog converter 34 of lower cost may be utilized.

Finally, the OUTPUT subroutine 66 is called to prevent a rapidly changing signal from appearing on the bus 32 of the microcomputer 34. First, the OUTPUT subroutine 66 determines whether the new eight bit command signal is less than the new eight bit command signal and, if so, adds a one to the old command signal until the old command signal equals the value of the new command signal. This step loops with the gradually changing digital signal appearing on the bus 32. Thereafter, the program returns to the main subroutine 46. However, if the old command signal is greater than the new command signal, a one is subtracted from the old command signal until the old command signals equals to the new command signal, at which time the OUTPUT subroutine 66 returns to the main program 46. It can be appreciated that an instantaneous change in current can make a clicking sound in the motor. The Hall effect devices are linear and smoothly output current to provide quiet motor operation, which is essential for floppy disc drives in desk-top computers.

Thus, there has been shown a new and improved motor speed control system that is capable of employing a microprocessor to measure the inter-pulse period of pulses generated by a tachometer coupled to the motor to be controlled, where the pulses are of relatively low frequency. In particular, a combined integral/proportional type of motor control, where the integral term is divided by N, is employed to control system gain to reduce the undesired effects of the phase delay imposed by the low frequency sampling, while achieving the maximum system gain. This invention also further suggests that the frequency of the signal applied to the counter be adjusted to also control system gain. In a preferred embodiment of this invention, integration and division are the sole digital arithmetic processes carried out in that these operations may be carried out rapidly to avoid imposing phase delays as would occur if digital multiplication occurred.

In considering this invention, it should be remembered that the present disclosure is illustrative only and the scope of the invention should be determined by the appended claims.

I claim as my invention:

1. Motor control apparatus for controlling the rotational velocity of a drive shaft of an electric motor in accordance with a reference time period indicative of the desired rotation velocity of the drive shaft, said motor control apparatus comprising:
(a) first means coupled to the drive shaft for providing first signals, each first signal corresponding to a given angle of drive shaft rotation;
(b) second means responsive to said first signals for providing second signals indicative of the time period between said first signals;
(c) difference means responsive to said second signals for providing difference signals indicative of the differences between said reference time period and the time periods indicated by said second signals;
(d) speed control means comprising means for integrating said difference signals and means for dividing said integrated signals by a factor N to provide divided signals, where N is selected to control the gain of said motor control apparatus.

2. The motor control apparatus, as claimed in claim 1, wherein said speed control means further comprises proportional means for providing signals proportional to said difference signals and summing means for summing said proportional signals with said divided signals to provide a motor speed control signal.

3. The motor control apparatus as claimed in claim 2, wherein said second means comprises means for providing clock signals of a given frequency, and means for counting said clock signals occurring between selected first signals for providing said second signals.

4. The motor control apparatus as claimed in claim 2, wherein said proportional means provides said proportional signal with a scaling factor of unity to thereby avoid multiplication and the introduction of phase delays in providing said motor speed control signal.

5. The motor control apparatus as claimed in claim 1, further comprising:
a plurality of sensors disposed at corresponding positions about the electric motor, each sensor for generating a train of timing signals as the drive shaft rotates past its corresponding position;
energizing means responsive to said motor speed control signal for providing an energizing signal of a corresponding level; and
a plurality of switch means respectively coupled to said plurality of sensors to receive said timing signals for sequentially applying said energizing signal to the electric motor.

6. The motor control apparatus as claimed in claim 5, wherein X of said first signals is provided per drive shaft revolution and X is a whole number, Y of said timing signals is provided per drive shaft revolution and Y is a whole number, and X equals (WY±1) and W is any whole number, and means for comparing the waveshapes of said first signals and said timing signals to identify a given relationship therebetween occurring only once per drive shaft revolution to generate a corresponding position signal.

7. Digital motor speed control apparatus for controlling in accordance with a reference time period indicative of the desired motor speed, the speed of a drive shaft of an electric motor in response to an inter-pulse period measured between pulses generated at a given frequency, each pulse generated in response to an incremental rotation of the drive shaft, said given pulse frequency being set relatively low tending to cause potential phase delays at the crossover frequency of a Bode plot of the output response of said digital motor speed control apparatus, said apparatus comprising:
  (a) means coupled to the drive shaft for generating a train of said pulses;
  (b) period measuring means comprising means for providing clock signals of a given frequency and means coupled to receive said pulses for counting said clock signals occurring between said pulses to provide a digital manifestation of said inter-pulse period;
  (c) means responsive to said inter-pulse period manifestation for providing a difference signal indicative of the difference between said reference time period and said measured inter-pulse period; and
  (d) speed control means comprising means for integrating said difference signal for providing an integration signal, means for dividing said integration signal by a factor N to provide a divided signal, proportional means for providing a signal proportional to said difference signal, and summing means for summing said proportional signal with said divided signal to provide a motor speed control signal, whereby the Bode plot of the composite motor response to said digital speed control apparatus has an integral curve portion and a proportional curve portion, said factor N and said given frequency being selected such that the gains of the integral curve portion and of said composite response are set respectively such that said crossover frequency is set to reduce the deleterious effects of said phase delays.

8. Digital motor speed control apparatus as claimed in claim 7, wherein said speed control means comprises a computer and a program executed by said computer for carrying out the functions of said integrating means, said dividing means, said summing means and said proportional means, said integrating means repetitively summing the present integration signal with the present difference signal to provide the next integration signal, said proportional means providing said proportional signal with a scaling factor of unity to avoid multiplication procedures, so that the time of program execution is minimized to avoid adding additional phase delays.

9. Motor control apparatus for both controlling the rotational velocity of a rotor of an electric motor and for providing a position pulse for each revolution of the rotor past a fixed point, the motor having a plurality of coils, said motor control apparatus comprising;
  (a) means coupled to the rotor for generating a first train of X pulses per rotor revolution, where X is a whole number;
  (b) a plurality of sensors, each generating a second train of Y timing signals per rotor revolution, where Y is a whole number and X equals (WY±1) and W is any whole number;
  (c) motor control means including means responsive to said pulses of said first train for measuring an inter-pulse period and for providing a command signal indicative of the desired motor energization level as a function of said measured inter-pulse period, means responsive to said command signal for providing an energizing signal of corresponding level, and switching means for applying said energizing signal in sequence to the motor coils in response to said timing signals of said second trains; and
  (d) means for comparing the waveshapes of said first train of pulses and said second train of signals from the least one of said sensors to identify a given relationship therebetween occurring once per rotor revolution to generate one of said position pulses.

10. The motor control apparatus as claimed in claim 9, wherein the first train of pulses and second train of signals, each pass through a transition between high and low states and said comparing means senses a first occurring transition of one of said signals of said second train in a first direction toward one of said high and low states, when a pulse of said first train is in its one state, to generate said one position pulse.

11. The motor control apparatus as claimed in claim 10, further comprising means responsive to said first occurring transition for prohibiting the further generation of a position pulse, until a transition of one of said signals of said second train toward said one state occurs while said pulse of said first train is another of said high and low states.

12. The motor control apparatus as claimed in claim 9, wherein each of said plurality of sensors is a Hall effect device, and there is further included means coupled to said energizing means for providing a reference signal of a level corresponding to said level, and there is included second comparing means coupled to an output of one of said Hall effect sensors for generating a signal when said output of said Hall effect device exceeds said variable reference signal and means for applying said output to said first-mentioned comparing means.

13. Digital motor speed control apparatus for controlling in accordance with a reference count indicative of the desired motor speed, the speed of a drive shaft of an electric motor, the electric motor having a plurality of coils, said apparatus comprising:
  (a) means coupled to the drive shaft for generating a first train of pulses, each pulses generated in response to an incremental rotation of the drive shaft;
  (b) a plurality of sensors disposed at corresponding points with respect to the electric motor, each of said sensors generating a second train of timing signals as the rotor rotates past its corresponding point on said motor;
  (c) period measuring means comprising means for providing clock signals of a given frequency and means coupled to receive said pulses of said first train for counting said clock signals occurring between said pulses to provide a count indicative of a measured inter-pulse period;
  (d) speed control means coupled to said period measuring means for providing command signals as a function of the difference of said reference count and said measured period counts;
  (e) current generator means responsive to said command signals for generating current of corresponding levels; and
  (f) a plurality of switching means, each connected to receive one of said second train of timing signals for cyclically applying said currents from said current generating means to the coils of the electric motor.

14. The digital motor speed control apparatus as claimed in claim 13, wherein each of said sensors provides a timing signal of a level which varies gradually and continuously between high and low states.

15. The digital motor speed control apparatus as claimed in claim 14, wherein each of said sensors comprises a Hall effect device.

16. The digital motor speed control apparatus as claimed in claim 14, wherein each of said switching means responds to a particular one of said second trains of timing signals to continuously and gradually modulate said current from said current generating means in accordance with that continuously varying level of the second train of timing signals applied thereto. In order to energize the electric motor in a quite fashion.

17. The digital motor speed control apparatus as claimed in claim 13, wherein said speed control means comprises a computer and a program executed by said computer for providing said command signals, for sensing a change of said command signals from one level to the next and for effecting a gradual change of the level of said command signals over a given period of time to thereby avoid a sudden shift in the current level applied to said plurality of switching means.

18. Motor control apparatus for providing a position pulse for each revolution of a rotor of an electric motor past a fixed point, said motor control apparatus comprising:
(a) means coupled to the rotor for generating a first train of X pulses per rotor revolution, where X is a whole number;
(b) plurality of sensors, each generating a second train of Y timing signals per rotor revolution, where Y is a whole number and X equals (WY±1) and W is any whole number; and
(c) means for comparing the waveshapes of said first train of pulses and said second train of signals to identify a given relationship therebetween occurring once per revolution to generate one of said position pulses.

* * * * *